United States Patent [19]

Erhardt et al.

[11] Patent Number: 4,630,404
[45] Date of Patent: Dec. 23, 1986

[54] APPARATUS FOR MANUFACTURING AND MACHINING GEARS

[75] Inventors: Manfred Erhardt, Puchheim; Herbert Loos, Dorfen-Stadt, both of Fed. Rep. of Germany

[73] Assignee: Carl Hurth Maschinen und Zahnradfabrik GmbH & Co., Munich, Fed. Rep. of Germany

[21] Appl. No.: 664,812

[22] Filed: Oct. 25, 1984

[30] Foreign Application Priority Data

Dec. 17, 1983 [DE]  Fed. Rep. of Germany ....... 3345800

[51] Int. Cl.$^4$ ............................................. B24B 5/00
[52] U.S. Cl. .................. 51/105 GG; 51/26; 51/287; 409/26; 409/51
[58] Field of Search ............. 51/26, 73 R, 95 GH, 51/105 HB, 105 GG, 287; 219/69 M, 69 V; 204/212, 224 M, 129.46; 409/26, 37, 38, 39, 51

[56] References Cited

U.S. PATENT DOCUMENTS

| | | | |
|---|---|---|---|
| 1,562,438 | 11/1925 | Copland | 51/287 |
| 1,884,292 | 10/1932 | Schurr | 51/26 |
| 2,069,324 | 2/1937 | Miller | 51/26 X |
| 2,607,175 | 8/1952 | Osplack | 51/287 |
| 3,085,369 | 4/1963 | Findley | 51/287 X |
| 3,464,312 | 9/1969 | Takahashi et al. | 409/29 |
| 3,796,851 | 3/1974 | Pfaff | 219/69 M X |

FOREIGN PATENT DOCUMENTS

| | | | |
|---|---|---|---|
| 1161465 | 1/1964 | Fed. Rep. of Germany | 51/287 |
| 217919 | 7/1968 | U.S.S.R. | 51/73 R |

*Primary Examiner*—Robert P. Olszewski
*Attorney, Agent, or Firm*—Flynn, Thiel, Boutell & Tanis

[57] ABSTRACT

An apparatus for manufacturing or machining externally toothed gears using a hyperboloidally or similarly formed, internally or externally toothed tool with abrasive tooth flanks. The tool and workpiece roll on one another about respective axes which cross at a distance. The tool has a sufficient axial dimension so that it is in engagement with the workpiece teeth from one side surface to the other of the workpiece. The workpiece and tool are coupled with guide wheel pairs. Each guide wheel pair runs with potential for backlash, but the overall gearing is such that no such backlash can occur.

4 Claims, 3 Drawing Figures

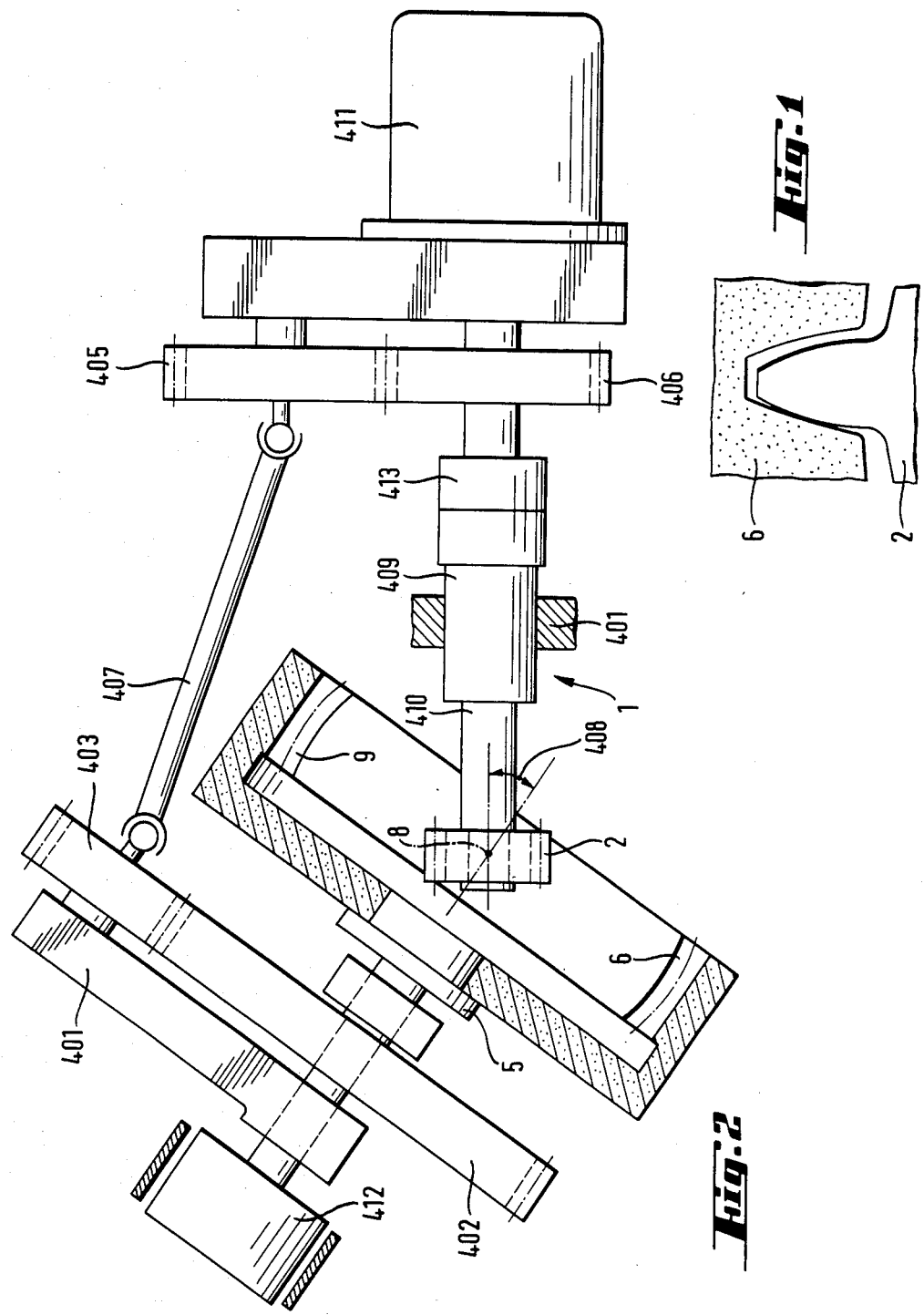

APPARATUS FOR MANUFACTURING AND MACHINING GEARS

FIELD OF THE INVENTION

This invention relates to an apparatus for manufacturing or machining gears and, more particularly, to an apparatus for manufacturing or machining straight or helically toothed, internally or externally toothed gearlike workpieces with a hyperboloidally, globoidally or similarly formed toothed tool which has an abrasive or similar surface and which has a sufficient axial dimension so that it is in engagement from one side surface of the workpiece tooth system to the other, wherein the axes of the workpiece and tool are skew lines which cross at a distance from each other, wherein the tool and workpiece are coupled with a guide wheel gearing train which has the same speed ratio as the workpiece and tool, and wherein the workpiece and tool roll on one another such that, during machining, only the right or left flank of each tool tooth contacts the workpiece teeth.

BACKGROUND OF THE INVENTION

A purpose of an apparatus disclosed in German Application No. P 33 04 980.7 (corresponds to U.S. Ser. No. 576,672 filed Feb. 3, 1984) is to facilitate a quick machining of hardened gears or gears of a hard material, wherein a high surface quality, and high tooth quality is assured.

A basic purpose of the invention is to increase the machining quality for particularly difficult cases of gear machining.

SUMMARY OF THE INVENTION

The basic purpose of the invention is solved by providing an apparatus in which one of the tool and workpiece is an internally toothed gear which has a hyperboloidally, globoidally or similarly formed rolling or pitch circle.

The basic concept of the invention is that, in this internal/external gearing combination, the close contact of the tool tooth flanks on the workpiece tooth flanks is greater than in an external/external gearing arrangement and, through this, more grains of the abrasive tool flank engage the workpiece simultaneously. The apparatus according to the invention can advantageously be used to machine internally toothed workpieces with an externally toothed tool, or vice versa.

An apparatus according to the invention is a simple total arrangement, the possibility of the loading and unloading and of reversing the drive being advantageously due to the provision of a gearing train which includes two guide wheel pairs.

A further favorable development in view of reversing the drive of the apparatus is offered by providing at least one homokinetic cardan shaft in the gearing train.

In view of U.S. Ser. No. 576,672 and other older patents, it might be assumed that, since the workpiece and tool pair are inventively an internal/external gearing arrangement, it would be appropriate to also use guide wheels which are internally and externally toothed. However, the inventors have found that, for operation, it is particularly advantageous if the guide wheels are all externally toothed gears.

BRIEF DESCRIPTION OF THE DRAWINGS

The invention will be discussed in connection with FIGS. 1 to 3. In the drawings:

FIG. 1 is a fragmentary sectional view showing a workpiece tooth engaging a gap between teeth of an internally toothed tool;

FIG. 2 is a side view, partly in section, of a machining apparatus embodying the invention.

DETAILED DESCRIPTION

Figure 3:
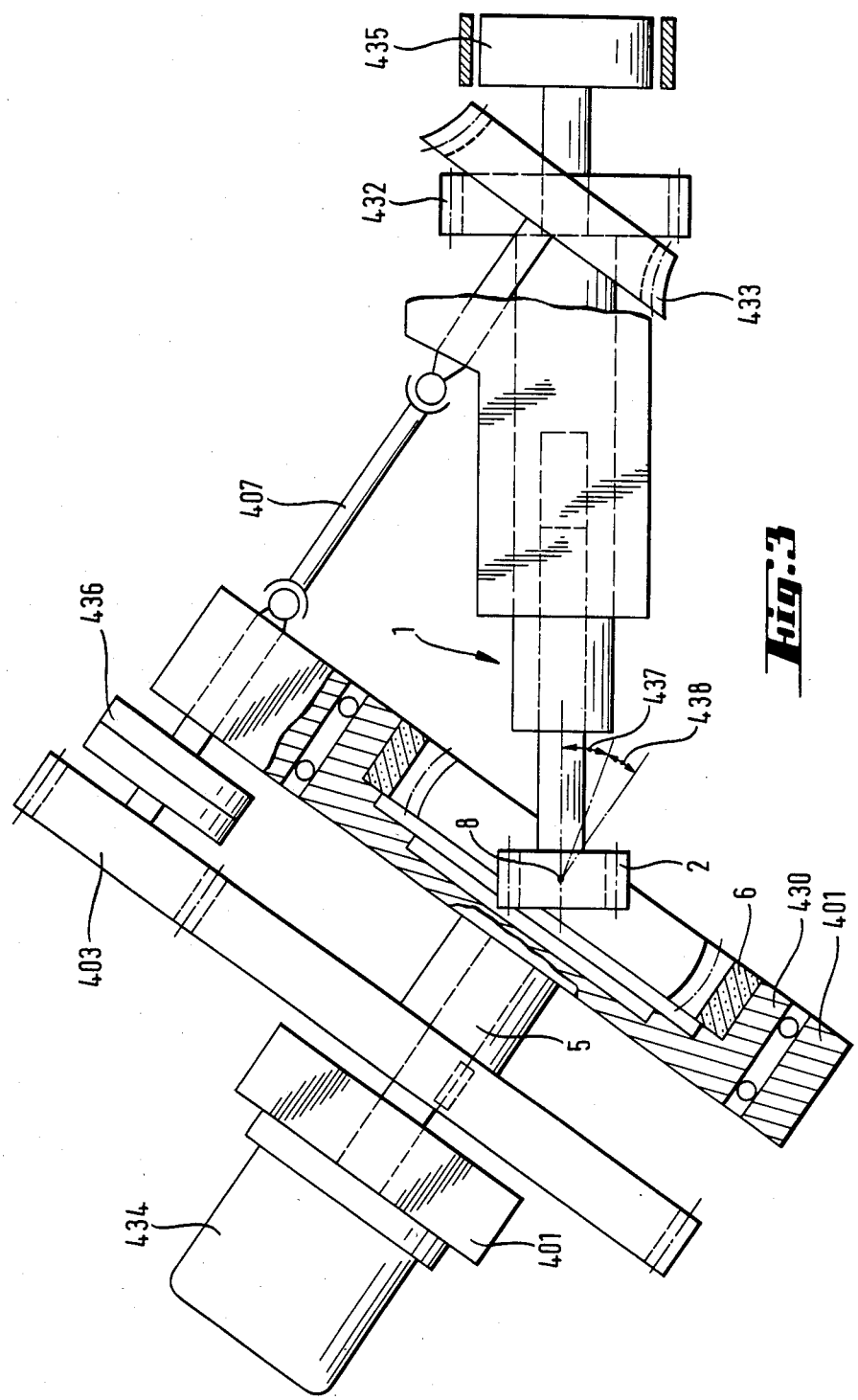
FIG. 3 is a view similar to FIG. 2 which shows an alternative embodiment of the apparatus according to the invention.

A gearlike workpiece 2 which is to be machined is clamped in a conventional manner on a workpiece spindle 1. The workpiece is machined with an internally toothed tool 6 which has abrasive tooth flanks, for example due to a coating with hard-material grains, or which includes an abrasive material, for example a grinding mass. The tool has the shape of an internal gear. The workpiece and tool roll on one another, whereby their axes are skew lines and cross in a side view. In FIGS. 2 and 3, the workpiece and tool lie in such a manner in respective planes so that their teeth mate. The pivot or crossed-axes point (which is a line 8 normal to and intersecting both axes) can lie within the workpiece and tool tooth systems or outside thereof. In the illustrated example, the pivot point 8 lies at the center of the longitudinal extent of the workpiece teeth. In the example, the workpiece is straight-toothed, and angle 408 identifies the angle of slope of the tool. The workpiece is machined without any longitudinal feed. The tool is therefore sufficiently wide so that it extends from one surface of the workpiece to the other, and is preferably slightly wider. Since machining is done with the so-called plunge method (without any longitudinal feed), the rolling member of the tool must grip hyperboloidally, globoidally or similarly around the cylindrically or differently formed rolling member of the workpiece. (The rolling member is the rolling or pitch circle which extends over the tooth width.) Thus, in the invention, the rolling member of the tool is formed as a hyperboloid 9 or similarly. The tool is exchangeably supported on a tool spindle 5, which in a suitable manner is supported on a machine frame 401. Also, a first guide wheel 402 is mounted on the tool spindle, and mates with a second guide wheel 403. The second guide wheel 403 is also supported on the machine frame 401. The first and second guide wheels 402 and 403 form a first meshing guide wheel pair. On the other side of the workpiece and tool there is a second meshing guide wheel pair, which consists of third and fourth guide wheels 405 and 406. The second and third guide wheels (403, 405) are operatively coupled by a homokinetic cardan shaft 407. Homokinetic joints and shafts are known. The fourth guide wheel 406 is supported on the free or right end of the workpiece spindle 1. The guide wheels can be exchanged and have ratios adjusted to the particular workpiece and tool. In the example, the workpiece-tool pair has a speed or translation ratio of approximately 1:3, the first guide wheel pair also has a ratio of 1:3, and the second guide wheel pair has a ratio of 1:1.

The workpiece spindle 1 is divided. It includes a fixed part 409 which is rotatably supported on the machine frame 401 and a movable part 410. The latter is longitudinally movable in the part 409, can be fixed against movement in the longitudinal direction relative to the part 409, and is fixed against rotation relative to the fixed part 409. The workpiece is releasably clamped on the movable part 410. The workpiece spindle 1 can be rotationally driven by a motor 411. The motor is designed to be able to reverse its direction of rotation. The tool spindle can be stopped by a friction brake 412. The fixed part 409 of the workpiece spindle is provided with a coupling 413, so that the workpiece can be uncoupled from the guide wheels 406 and 405. In place of the brake 412, it is also possible to provide a flywheel.

When the term "machine frame" is used herein, this term includes all parts connected thereto, such as a carriage and the like.

The tooth gap width of the tool 6 is larger in the respective rolling or pitch circle than the tooth thickness of the workpiece 2. Thus, the machining operation is done with a potential for backlash. What is important is that, in the guide wheels, there is also potential for backlash, but on the opposite tooth flanks, so that the entire gearing, which includes the workpiece-tool pair and the first and the second guide wheel pairs, runs without any potential for backlash. By reducing the center distance, namely, the distance between the workpiece and tool axes along the line 8 (the apparatus for effecting this reduction being known and therefore not illustrated), the chip feed can be effected. By suitably changing the direction of rotation of the motor 411, the tooth surfaces which are in engagement can be changed by means of the brake 412. For this, the coupling 413 must be opened for a short time. The arrangement of the motor, the brake or flywheel, and the coupling can be varied within the entire gearing, as is shown in U.S. Ser. No. 576,672 and in other older patents.

FIG. 3 illustrates an alternative embodiment which corresponds in principle with the above-described embodiment. The tool 6 is exchangeably supported by a tool carrier 430, which in turn is rotatably supported directly on the machine frame 401, for example by ball bearings. A second guide wheel pair 432 and 433 has a so-called spiral gearing. At least one of the wheels 432 and 433 is a combination of a hyperboloidal gear and a bevel gear. This results in more favorable constructive relationships for the connection to a first guide wheel pair 402 and 403 and, in particular for the deflecting angle of the cardan shaft 407, which can possibly be replaced with another kinematic connection. A motor 434 is arranged on the tool spindle 5, a brake 435 on the workpiece spindle, and a coupling 436 between the guide wheel pairs. By changing the direction of rotation of the motor, stopping the workpiece spindle, and opening and closing the coupling, the engaging tooth flanks on the workpiece and tool can be changed. With this, or with the apparatus of FIG. 1, it is of course also possible to machine helical gears. In FIG. 3, reference numeral 437 identifies the angle or slope of the workpiece teeth relative to the workpiece axis, and reference numeral 438 identifies the angle or slope of the tool teeth relative to the tool axis. It is to be noted that, in FIG. 3, the identified tooth angle lies on the far side of the workpiece 2.

Certain carriages, feeding devices, swivelling devices and driving devices which are conventional in a machine tool of the type to which the invention relates have been omitted from the figures for clarity.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an apparatus for the precision working of a tooth system of a rotatably supported gearlike workpiece by rolling the teeth of said gearlike workpiece with teeth on a rotatably supported gearlike tool, the axes of rotation of said workpiece and said tool being spaced along a common normal, said apparatus having a support means supporting said rotatably supported workpiece and tool for movement toward and away from each other in a direction parallel to said common normal and so that said axes of rotation thereof are crossed, guide gear train means with normal backlash therebetween coupled to and extending between said workpiece and said tool, said guide gear train means providing an effective speed ratio that is the same as between said workpiece and said tool, abrasive surface means on said teeth of said tool, said tool teeth being free of uniformly directed cutting edges, said tool further being formed hyperboliodially in the axial dimension thereof so that when said workpiece and said tool are engaged, at least one of said teeth of said tool is engaged by at least one of said teeth on said workpiece over the entire axial length of the tool tooth, first means providing a first tooth contact between successive teeth on said tool and successive teeth on said workpiece on only one side of each of said successive teeth on said tool, a backlash spacing being provided between each of said successive teeth on said workpiece and the opposite side of each of said successive teeth on said tool, second means for adjusting the relative position between said workpiece/tool and said guide gear train means so that the operatively engaged combination of said workpiece/tool and said guide gear train means is entirely backlash free, the improvement comprising wherein at least one of said tool and said workpiece is an internally toothed gear.

2. The apparatus according to claim 1, wherein said gear train means between said workpiece and said tool includes at least two guide wheel pairs, one after the other.

3. The apparatus according to claim 2, wherein said guide gear means includes at least one shaft which is a homokinetic cardan shaft.

4. The apparatus according to claim 2, wherein said guide wheel pairs include externally toothed gears.

* * * * *